United States Patent
Mullen et al.

(10) Patent No.: US 11,869,222 B2
(45) Date of Patent: Jan. 9, 2024

(54) GEOSPATIAL DATA ABSTRACTION LIBRARY (GDAL) CONVERSION TOOL FOR DATA COMPRESSION

(71) Applicant: The United States of America, as represented by the Secretary of the Navy, Crane, IN (US)

(72) Inventors: Robert E. Mullen, Bloomington, IN (US); James A. Hammack, Huntsville, AL (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 104 days.

(21) Appl. No.: 17/691,712

(22) Filed: Mar. 10, 2022

(65) Prior Publication Data

US 2022/0292729 A1 Sep. 15, 2022

Related U.S. Application Data

(60) Provisional application No. 63/159,022, filed on Mar. 10, 2021.

(51) Int. Cl.
*G06T 9/20* (2006.01)
*G06T 7/90* (2017.01)
*G06V 20/13* (2022.01)

(52) U.S. Cl.
CPC .................. *G06T 9/20* (2013.01); *G06T 7/90* (2017.01); *G06V 20/13* (2022.01);
(Continued)

(58) Field of Classification Search
CPC .......... H04N 19/40; H04N 19/85; G06T 7/90; G06T 9/20; G06T 2207/10032;
(Continued)

(56) References Cited

U.S. PATENT DOCUMENTS 5,892,847 A * 4/1999 Johnson ................. H04N 19/80
 375/E7.193
6,463,102 B1 * 10/2002 Linzer .................... H04N 19/51
 348/241

(Continued)

*Primary Examiner* — Katrina R Fujita
(74) *Attorney, Agent, or Firm* — Naval Surface Warfare Center, Crane Division; Christopher Feigenbutz; Patrick Law

(57) ABSTRACT

Provided are methods and apparatus for creating super-compressed map files. Using free and open-source software (FOSS), the tool create a super-compressed internally tiled Geo Tag Image File Format (TIFF) in a WGS84 datum (WGS84) similar in size to the original LizardTech's MrSID (SID) imagery from the National Geospatial-Intelligence Agency (NGA). Converting NGA data to WGS84 allows mapping systems like NASA Worldwind (WW) to eliminate the step of re-projecting on the fly from non-native projections, thus reducing processing time. The disclosed method includes removing all pure-black pixels by setting them to black+1, changing all near-black border pixels with values less than 15 to 0 (pure black), setting pure black values to "no-data," compressing the image with a compression scheme, and translating the compressed image to JPEG and a YCbCr color space to achieve greater compression.

13 Claims, 5 Drawing Sheets

(52) U.S. Cl.
CPC ............ *G06T 2207/10032* (2013.01); *G06T 2207/30181* (2013.01); *G06T 2207/30184* (2013.01)

(58) Field of Classification Search
CPC ........... G06T 2207/30181; G06T 2207/30184; G06V 20/13
See application file for complete search history.

(56) References Cited

U.S. PATENT DOCUMENTS

| | | | | |
|---|---|---|---|---|
| 6,621,867 | B1 * | 9/2003 | Sazzad | G06T 7/12 348/E5.064 |
| 8,098,328 | B2 * | 1/2012 | Fujisawa | H04N 7/0122 348/556 |
| 2008/0253647 | A1 * | 10/2008 | Cho | G06V 30/413 382/164 |
| 2016/0148433 | A1 * | 5/2016 | Petrovskaya | G02B 27/01 345/633 |

* cited by examiner

300

400

US 11,869,222 B2

GEOSPATIAL DATA ABSTRACTION LIBRARY (GDAL) CONVERSION TOOL FOR DATA COMPRESSION

CROSS-REFERENCE TO RELATED APPLICATIONS

The present application claims priority to U.S. Provisional Patent Application Ser. No. 63/159,022 filed Mar. 10, 2021, and entitled "GDAL SCRIPT CONVERSION TOOL," the disclosure of which is expressly incorporated by reference herein.

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon. This invention (Navy Case 200606US02) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD

The field of the present disclosure generally relates to data compression tools for map data. More particularly, the disclosure pertains to a software tool for creating compressed data (e.g., map data) using data compression and image border removal techniques to reduce the map data size.

BACKGROUND

Previous methods for creating super-compressed internally tiled Geo Tiff (TIFF) in WGS84 datum (WGS84) required the use of proprietary software, such as multiresolution seamless image database (MrSID) by LizardTech (also known as Extensis). Such software, however, can be prohibitively expensive for some users. Additionally, there is no known open source implementation for creating super-compressed internally tiled Geo Tiff (TIFF) in World Geodetic System (WGS84) datum in known formats such as MrSID format, for example. Other known image compression techniques may result in file sizes 20-30 times larger than the equivalent MrSID files.

SUMMARY

The present disclosure relates to data compression tools for creating compressed map files. Using, in part, free and open-source software (FOSS), the data compression tools create a super-compressed internally tiled Geo Tiff (TIF) in a WGS84 datum (WGS84) similar in size to original MrSID imagery from the National Geospatial-Intelligence Agency (NGA). Converting NGA data to WGS84 allows mapping systems like NASA Worldwind (WW), for example, to eliminate the step of on-the-fly re-projecting from non-native projections, thus reducing processing time.

In an aspect, the present disclosure features a method compressing map image data. The method includes setting all pixels in the map image data having a pure black value of zero to a plus one value, setting map border pixels of the map image data having a value less than a predetermined value to a value of zero, setting the map border pixels of the map image data previously set to value of zero to a no data designation, compressing the map image data using at least one predetermined compression scheme to create compressed map image data, and translating the compressed map image data to a joint photographic experts group (JPEG) image formatted map image file.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the disclosed embodiments have been selected to enable one skilled in the art to practice the invention.

Figure 1:
FIG. 1 shows an example of NGA-produced SIDs with black borders in a Universal Transverse Mercator (UTM) projection.

FIG. 1 shows an example of NGA map data, including NGA produced seamless image databases (SIDs) in a Universal Transverse Mercator (UTM) projection, such as in MrSID format. In the example of FIG. 1, it is noted that two merged NGA-produced seamless image databases (SIDs) as used, but this is merely exemplary. The displayed (and stored) map image 100 may include black pixel borders such as shown at 102, as one example, which is generally present in NGA map data. This border information 102 is not particularly useful or meaningful when displaying images to a user and also adds unnecessary size to the map data. Accordingly, the present invention provides a first tool (or script) that is configured to remove the black border information to reduce the size of the map data, which includes deletion of black pixels throughout the map data as will be discussed in more detail below.

Of further note, deletion of black pixels throughout map data may result in the deletion of meaningful map data inside the map (e.g., map 100). Accordingly, the present invention provides for the first tool (or script) to be further configured to ensure that black pixels within the map are not unnecessarily deleted, which will be discussed in more detail below.

Of still further note, the present invention provides at least a second tool (or script) that is then configured to convert NGA's MrSID to a super-compressed Geo TIFF with a Datum of WGS84, for example. The second tool employs data compression techniques such as lossless compression or lossy compression (or both), as well as converting or translating the MrSID format to joint photographic experts group (JPEG or .jpg) format or to both JPEG and YCbCr (YCC)

color space where Y is the brightness (luma), Cb is blue minus luma (B-Y) and Cr is red minus luma (R-Y).

Figure 2:
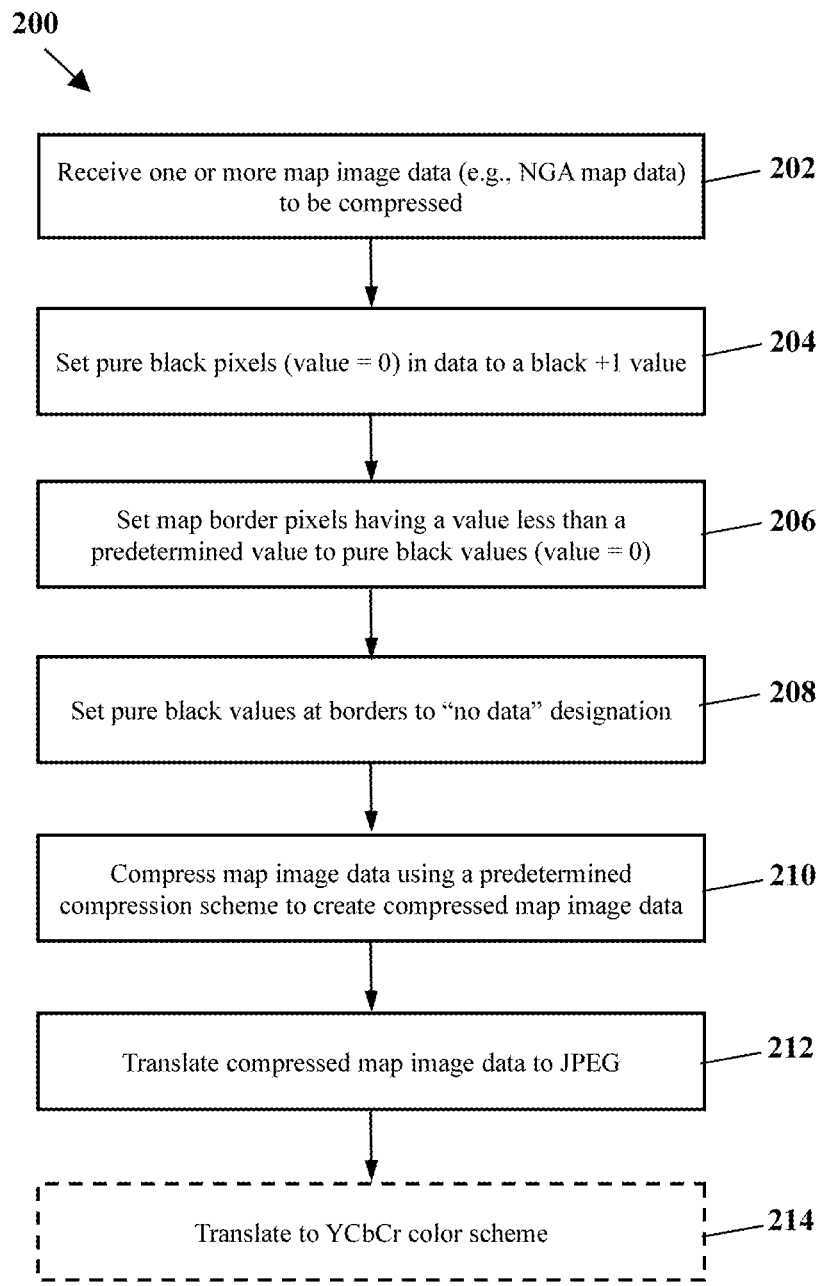
FIG. 2 shows a methodology for data compression according to aspects of the present disclosure.

Turning to FIG. 2, this drawing illustrates a flow diagram of a method 200 for performing data compression for map data according to aspects of the invention. In this method 200, data to be compressed is received in a processor and memory or database as shown at block 202. In an aspect, the data is NGA map data configured according seamless image databases (SIDs), and in other aspects MrSID, in particular.

Next, the method 200 includes setting all pure black pixels in the image data that have a black value of zero (0) in the image data to a value of black+1 value (i.e., setting to a value of one, although the method is not limited to such and could be greater values that still represent dark pixels) as shown in block 204. The process of block 204 is performed due to the potential of the existence pure black pixels (i.e., value=0) within the map data, such as for lakes or other dark geographic features. Setting the pixels to some value (e.g., +1) above pure black serves to ensure that this data in the map image is not deleted when compressed, as compression will reduce the data by compressing the pure black pixel data.

Method 200 further includes setting the map border pixels, such as 102 in FIG. 1, to pure black (i.e., value=0) as shown in block 206. Since the pixels in the borders may not be exactly pure black, the process of block 206 further includes determining the border areas or tiles of the image data and then setting the pixel values less than some predetermined value to the pure black value zero. In some aspects, the predetermined value may be 15, but is not limited to such and may be a value that effectively sets darker or black border pixels to zero. The reason for the process of block 206 is to cause the removal of the borders of the map image data that is typically found in NGA image data, and the pure black pixels can be removed to reduce the image file size. Further, it is noted that when pixels that are close to black or are dark but not pure black, if these pixels are not removed, the compressed image will have fuzziness. Thus, the process of block 206 serves to help clean up this fuzz by causing the removal of darker pixels at the borders of image data during data compression, which will be discussed in further detail below. In other aspects, the process of block 206 may include a border routine that identifies the border areas of the image data prior to compression, so that the pixels at the image borders that are less than the predetermined value of blackness are easily and quickly identified, as well as for facilitating the processes of block 208 described below. In aspects, the border route is configured to identify borders of the map image data and will cause the removal or very large compression of the border data based identifying the set map border pixels of the map image data having a value less than a predetermined value to a value of zero Furthermore, the border routine may be used in the processes of block 208 to set pure black data at the borders to "no data" designation, as will be discussed below.

After the process of block 206, method 200 includes setting pixels at the image borders that were previously set to pure black values in block 206 to a "no data" designation as shown at block 208 In some aspects, the setting of the pixels to zero or pure black makes identification of those pixel quick to then attach the "no data" designation. This, in essence, serves to strip the border pixels from the image, but also allows that pixels in these locations can be overwritten when merged or combined with other NGA map data. That is, if the image is combined with other NGA images, the overlap of those pixels geospatially can be overwritten or overlapped with data from the other images when merged or combined to fill in the actual map data in the border areas that we previously black. In aspects, the "no data" designation makes the pixels transparent where, when merged with another image map data file, the data from the other file overwrites the "no data" pixels. Thus, when using GDAL scripts for combination of images, a user doesn't have to do anything (i.e., the "no data" pixel are ignored) when creating a merged or combined image Next, method 200 includes compressing the map image data using a predetermined compression scheme to create compressed map image data as shown at block 210. In some examples, the predetermined compression scheme may be Lempel-Ziv-Welch (LZW) compression, which is a lossless compression method. It will be appreciated by those skilled in the art that other types of lossless compression methodologies may also be utilized in the present method 200. In other aspects, it is contemplated that lossy compression could be utilized for the processes in block 210 as well. In aspects, the compression strips the pure black values (now "no data" values) of the borders, but maintains other image data (i.e., the pure black values set to +1 within the actual image data).

It is noted that the method 200 may be implementing using geospatial data abstraction library (GDAL) scripts. Furthermore, method 200 may be implemented on a specialized processor, or equivalents thereof.

Figure 3:
FIG. 3 shows NGA-produced Tag Image File Format files (TIFFs or TIFs) with black borders removed and in WGS84 after use of the border clean-up methods illustrated in the method of FIG. 2.

Turning to FIG. 3, the shown FIG. 300 shows an example of the map image file 100 of FIG. 1 after the processing of blocks 204, 206, 208, and 210 (essentially after clean up using the first tool as mentioned above), with the borders removed or stripped. In particular, FIG. 3 is an NGA produced TIFs with black borders removed and in WGS84 using lossless compression in block 210. It is noted that the size of this map image file may be 20-30 times larger than the original SIDs input. Accordingly, turning back to FIG. 2, method 200 further includes translation of the compressed map image data to JPEG format, as shown in block 212. It will be appreciated by those skilled in the art that translation to JPEG format effectuates a lossy compression, which greatly reduces the file size of the compressed map image data from block 210 when using lossless compression, such as LZW.

Figure 4:
FIG. 4 shows NGA-produced TIFs with black borders removed and in WGS84 after compression methods illustrated in the method of FIG. 2.

As an example, FIG. 4 shows the same two NGA-produced TIFs with black borders removed and in WGS84 and translation/compression/conversion to JPEG. It is noted that method 200 may also include translation or conversion of the compressed JPEG map image data to a YCbCr color space or scheme from an RGB color space of scheme as shown in alternate block 214. This translation results in even further data compression to create image data files that are 20-30 times smaller by translating to at least JPEG. which is generally slightly larger than the original MrSID image, for example. Additionally, by further employing conversion to YCbCr, the file size is further reduced is size and is generally slightly smaller than the original MrSID image.

Of note, in the illustrated examples the image file sizes of the two NGA produced SIDS in the original image in FIG. 1 were 39 MB and 35 MB. After the application of the processes of blocks 204, 206, 208, and 210, the file sizes of the image in FIG. 3 were 498 MB and 440 MB, respectively. Finally, after application of the processes of blocks 212 and 214, the image files sizes of the image in FIG. 4 were 34 MB and 28 MB, which are slightly smaller than the original SIDs.

It is noted that the processes of method 200 may be, in some examples, implemented with two tools (first and second tools, which could also be configured as software modules), as was mentioned above. The first tool includes utilization of a Unix/Linux script to convert NGA's MrSID to Geo TIFF with a Datum of WGS84. This script (termed herein as "cleanup.sh") converts the MrSID to a WGS84 Geo TIFF, serves to remove the pure-black pixels, set all border pixel values of 15 or less to 0 (pure black), sets pure black values to "no-data," and compresses it with LZW compression. The processes effected by the first tool or module correspond to blocks 204, 206, 208, and 210 in FIG. 2.

The second tool (or module) includes two Unix/Linux scripts to convert NGA's MrSID to super-compressed Geo TIFF with a Datum of WGS84. The first of the two scripts is termed "create_gboss_maps.sh" and the second of the two scripts is termed "create_gboss_maps_jpg_ycbcr.sh." The script "creat_gboss_maps.sh" may be configured to convert the MrSID to WGS84 GeoTIFF, remove of all pure-black pixels by setting them to black+1, change all near-black border pixels with values less than 15 to 0 (pure black), set pure black values to "no-data," and compress the image with LZW compression and translates to JPEG & YCbCr (generally slightly smaller than the original MrSID image) or translates to JPEG (generally slightly bigger than the original MrSID image). The script termed "create_gboss_mapsjpg_ycbcr.sh" may be configured to take images created with "cleanup.sh" of the first tool and makes them 20-30 times smaller by translating to JPEG and YCbCr (generally slightly smaller than the original MrSID image) or translating to JPEG (generally slightly bigger than the original MrSID image).

Figure 5:
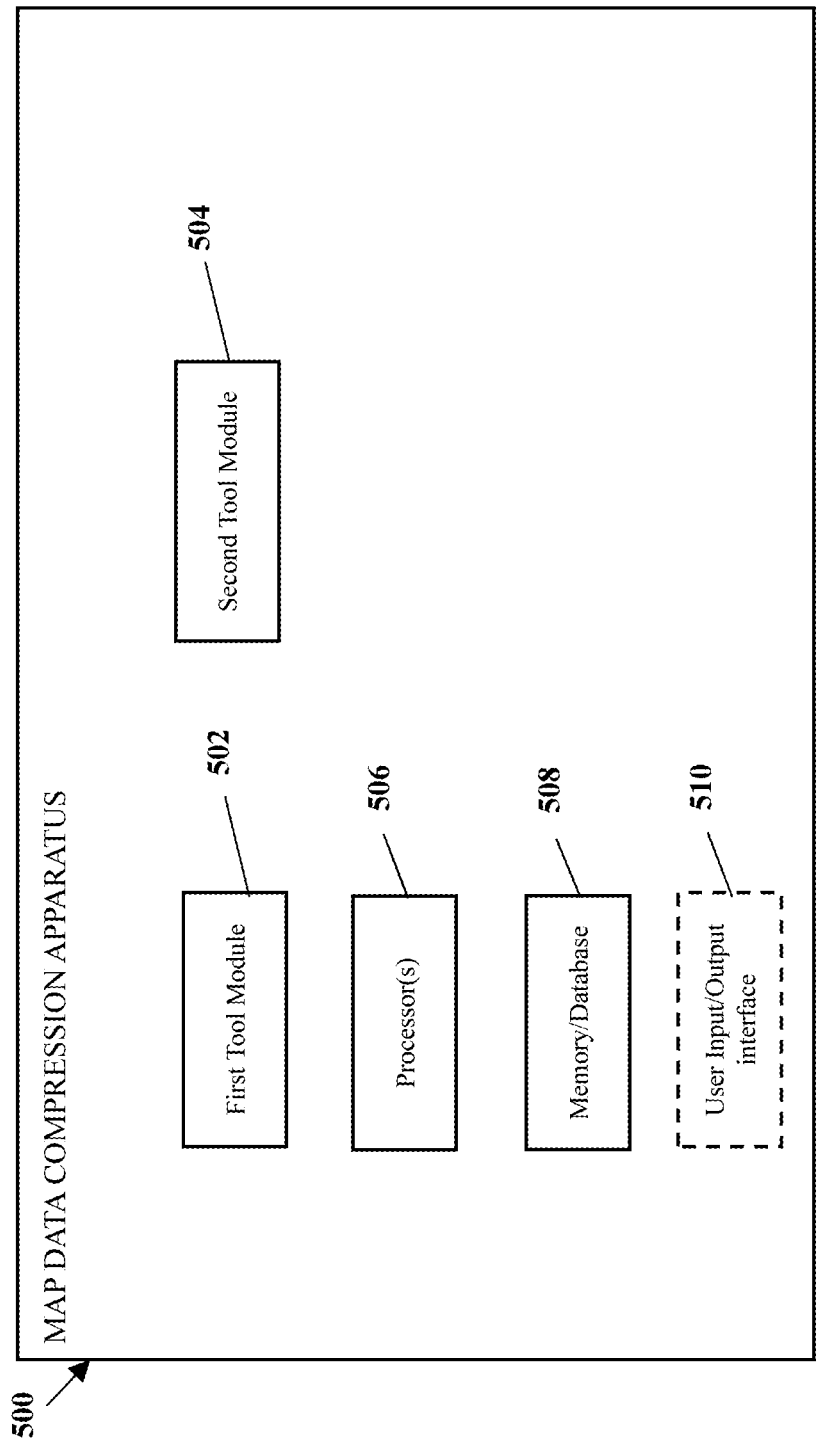
FIG. 5 shows a block diagram of an apparatus for data compression according to aspects of the present disclosure.

An embodiment of an apparatus for map data compression is shown at 500 in FIG. 5. Here, the apparatus 500, which may be implemented as a specialized processor or specialized processor system, includes a first tool module 502, which may correspond to the first tool discussed above and is configured to implement the processes of blocks 204, 206, 208, and 210 in one example. Apparatus 500 may also include a second tool module 504, which is configured to implement the second tool discussed above. In some examples, the second tool module may implement the processes of block 212 and 214 discussed above. Alternatively, the second tool module 504 may be configured to implement all of the processes of first tool module 502 when executing the processes of script "create_gboss_maps.sh" discussed above, or, alternatively, execute only processes in blocks 212 and 214 when executing the processes of script "create_gboss_mapsjpg_ycbcr.sh."

Apparatus 500 may also include one or more processor 506 and a memory/database 508 for storing computer implemented instructions executable by processor 506 (include processes to identify image borders, for example), as well as to retrieve, output, and/or display image data with an optional user input/output interface 510.

In an example of implementation of the method 200 or apparatus 500, 50 NGA SIDs that were used as a test set with the script "create_gboss_maps.sh." Testing determined that the super-compressed TIFFs did not lose any clarity over the SIDs and were of similar size to the SIDs. In application, a user, such as a soldier can utilize these compressed TIFs in most geographic information systems (GISs) and digital mapping systems for threat analysis, decision aids, and the ability to look at an area before they get there.

Although the invention has been described in detail with reference to certain preferred embodiments, variations and modifications exist within the spirit and scope of the invention as described and defined in the following claims.

The invention claimed is:

1. A method for compressing map image data, the method comprising:
setting all pixels in the map image data having a pure black value of zero to a plus one value;
setting map border pixels of the map image data having a value less than a predetermined value to a value of zero;
setting the map border pixels of the map image data previously set to value of zero to a no data designation;
compressing the map image data using at least one predetermined compression scheme to create compressed map image data; and
translating the compressed map image data to a joint photographic experts group (JPEG) image formatted map image file.

2. The method of claim 1, further comprising:
translating the JPEG image formatted map image file to a YCbCr color space.

3. The method of claim 1, wherein the at least one predetermined compression scheme comprises a lossless compression scheme.

4. The method of claim 3, wherein the lossless compression scheme comprises Lempel-Ziv-Welch (LZW) compression.

5. The method of claim 1, wherein the at least one predetermined compression scheme comprises a lossy compression scheme.

6. The method of claim 1, wherein the compressed image file comprises a super-compressed an internally tiled Geo Tiff (TIFF) in a WGS84 datum (WGS84).

7. The method of claim 1, wherein translating the compressed map image data to a joint photographic experts group (JPEG) image formatted map image file includes lossy compression of the compressed map image data.

8. The method of claim 1, wherein setting map border pixels of the map image data having a value less than the predetermined value to the value of zero includes identifying borders of the map image data.

9. The method of claim 8, wherein setting the map border pixels of the map image data previously set to value of zero to a no data designation includes utilizing previously identified borders of the map image data.

10. The method of claim 1, wherein the predetermined value is 15.

11. The method of claim 1, wherein the map image data comprises National Geospatial-Intelligence Agency (NGA) seamless image database (SID) formatted data.

12. The method of claim 1, wherein the method is implemented using geospatial data abstraction library (GDAL) scripts.

13. The method of claim 1, wherein compressed map image data comprises a Geo Tag Image File Format (TIFF) file.

* * * * *